United States Patent Office 3,437,622
Patented Apr. 8, 1969

3,437,622
POLYURETHANE-BASED PRESSURE-SENSITIVE ADHESIVES
Rolf Dahl, West Columbia, S.C., assignor to Anchor Continental, which is the trade name under which business is done by Continental Tapes, Incorporated, Columbia, S.C., a corporation of South Carolina
No Drawing. Filed Dec. 6, 1965, Ser. No. 512,002
Int. Cl. C09j 7/04; C08g 41/00
U.S. Cl. 260—24
12 Claims

ABSTRACT OF THE DISCLOSURE

Pressure-sensitive adhesives and methods of making same based upon polyurethane polymers formed in situ by reaction of polyols and organic polyisocyanates.

---

This invention relates to entirely new types of pressure-sensitive adhesive compositions with unique properties and advantages. In the past, such adhesives have comprised combinations of natural rubber or certain synthetic elastomers mixed with tackifying resins, softeners, fillers, etc., wherein the required internal strength (cohesiveness) of the adhesive is provided by the elastomer. Normally the method of making such adhesive has required a complex procedure involving breakdown of the elastomer and/or compounding on a rubber mill; and modification of adhesive and/or cohesive properties of the mass in order to adapt it to varied uses. Such modification has been limited and has required complex and not entirely satisfactory procedures.

I have discovered a new type of pressure-sensitive adhesive which can be made by very simple procedures and whose properties can readily be modified to yield adhesives for many and varied uses. My adhesives do not require the use of natural or synthetic elastomers but are based on the formation in situ of certain polyurethane polymers made by the reaction of polyols (for example, polyethers containing hydroxyl groups) with organic, aromatic polyisocyanates (for example, tolylene diisocyanate). The chemistry of such reactions is well known as described in my copending application, Ser. No. 297,190, filed July 24, 1963 (now abandoned); in the treatise by B. A. Dombrow entitled "Polyurethanes," published by Reinhold Publishing Corp., New York, N.Y. (1957); in "The Chemistry of the Organic Isocyanates," Chemical Reviews, 43, 203–218, (1948); and in "Urethane Plastics," Ind. Eng. Chem., 48 1383–91.

My preferred polyurethane polymers are those produced by the reaction of an organic, aromatic polyisocyanate with diols of hydroxyl number (milligrams of KOH equivalent per gram of polyol) between about 56 and about 265, which give tough, flexible polymer films; and triols of OH number between about 28 and about 56. If the diol OH number is below about 56, the reaction product tends to be soft and of lower internal strength; if the OH number is above about 265, the product tends to be hard and lacking in tack. I may use such diols or triols either alone or in any mixture with each other. Polyols higher than triols are used mainly as crosslinking agents for the polymers, in amounts not over 10% by weight of the diols and/or triols. A diol alone tends toward lower internal strength and a triol alone tends toward less satisfactory aging and lower tack. However mixtures of a triol with 10–90% by weight diol gives superior results. The preferred diols have molecular weights between about 400 and about 3000. Diols of less than 400 molecular weight do not yield a tacky product and those above about 3000 molecular weight yield a product that is too soft. The preferred triols have molecular weights between about 3000 and about 10,000. Those below about 3000 yield products with lower tack and above 10,000 are too hard. Castor oil (a polyol) can be used to replace part of the polyols. The polyols used include polyhydroxy ethers (substituted or unsubstituted polyalkylene ether glycols or polyhydroxy polyalkylene ethers), polyhydroxy polyesters and the ethylene or propylene oxide adducts of polyols. The latter are preferred because of availability, cost and adaptability to my use. The presently readily available and relatively cheap tolylene diisocyanate is preferred although other organic, aromatic polyisocyanates can be used, such as those of ethyl benzene, xylene, bitolylene, methyl diphenyl methane, dimethyl diphenyl methane, dianisidine, diphenylxenylene, dichloroxylene, dimethoxy biphenyl and others. It is preferred to use a polyisocyanate whose isocyanate groups differ in reactivity—like those of tolylene diisocyanate wherein one of the isocyanate groups is sterically hindered by its proximity to the methyl group; or a polyisocyanate wherein one of the isocyanate groups differs in reactivity due to other substituents like chlorine or other groups. This difference in reactivity permits only the less reactive groups to remain after pre-polymer formation (see below), giving the pre-polymer greater stability during the period after pre-polymer formation and before the final steps of my process. As will be shown below, I also use for special purposes the isocyanate adducts (see Dombrow, pp. 26, 27, 28) which are addition products of polyisocyanates with phenol or the enol forms of acetoacetic ester, acetomalonic ester, acetyl acetone, benzoyl acetone or acetylacetaldehyde and the isocyanate dimers like that formed by dimerization of the 4-position isocyanate groups of tolylene diisocyanate. These adducts are unreactive at ordinary temperature but release isocyanate at higher temperatures—for example, the phenol adduct at about 160° C., the acetomalonic ester adduct at about 130° C. and the dimer at about 150° C.

For the purpose of the present invention, I use a proportion of polyisocyanate (or diisocyanate) between about 0.8 of the stoichiometric amount to react with all the hydroxyl groups of the polyols, up to about twice the stoichiometric amount. Less than about 0.8 the stoichiometric amount does not give a tacky film as reaction product, but is too soft. More than twice the stoichiometric amount gives high internal strength but low tack. It is to be noted that excess isocyanate above that required to theoretically react with all the hydroxyl groups of the polyols, still reacts to yield further polymers, for example, the allophanates.

I may add tackifying resins to increase the tack but many such resins are not compatible—i.e. they do not mix with the polymers and/or they react with isocyanates. I prefer to use resins with low acid number (milligrams KOH equivalent per gram of resin), for example below 10. Suitable resins are the rosin esters, the glycerol ester of hydrogenated rosin, coumarone-indene resins, resins from unsaturated aliphatic hydrocarbons and polyterpene resins. The resin used may vary between 2 and 10% by weight of the polyol used. I may also use compatible plasticizers to improve "quick-stick," for example, chlorinated diphenyl, the ethylene glycol ester of rosin or the methyl ester of hydrogenated rosin. It is preferred to use a plasticizer with acid number below about 10. The proportion of plasticizer may be between about 5 and about 25% by weight of the polyols used.

My general procedure is, for example, to mix my polyols, resin and plasticizer; then add tolylene diisocyanate and stir and heat to about 100° C. for about 1 hour, or until the reactive isocyanate groups are used. This may also use up some of the less reactive groups. I then dissolve in toluene the pre-polymer so formed and dilute with toluene to the proper coating viscosity and 0.4 to 5% of the weight of pre-polymer of a urethane catalyst (for example, stannous octoate, stannous dilaurate, dibutyl tin laurate, lead naphthenate or a tertiary amine) and then spread the solution on a flexible backing material and dry in a circulating air oven with the air at about 250° F. The heating reacts the remaining isocyanate groups and completes formation of the desired polyurethane polymers. I prefer to thus form the pre-polymers since otherwise the mixture of polyols and polyisocyanate is too thin for spreading on the inert backing and if the whole reaction were carried out in the drying oven, the time required would be excessive.

If I wish to produce a high temperature masking tape (i.e. a tape that has satisfactory tack at ordinary temperature and in use in a lacquer or enamel baking oven at around 300° F. does not lose all its tack and has sufficient internal strength in the mass so that it does not leave a residue of mass when removed from the surface to which it has been adhered), I use, for example, tolylene diisocyanate (which reacts in my pre-polymer formation and heating and drying) and an isocyanate adduct that releases isocyanate groups at higher temperature (for example, at 300 to 320° F., in the case of the phenol adduct) which then react to give a cross-linking and form a tough, higher polyurethane polymer to impart high internal strength to the adhesive mass and give easy release without transfer of the mass to the surface on which it is adhered, I may accomplish a similar result, but at the expense of some loss of room temperature tack, by increasing the tolylene diisocyanate to around twice the stoichiometric amount and not use the adduct.

Instead of using toluene as solvent for my pre-polymer, I may use other solvents that are volatile and inert, such as the acetate of the monomethyl, monoethyl or monobutyl ether of ethylene glycol; ether acetate; butyl acetate; various ethers or ketones; toluene mixed with volatile liquid aliphatic or naphthenic hydrocarbons.

Illustrative of the methods I use and the products I obtain, are the following Examples 1–3. (All proportions given in this application are by weight.)

Example 1

200 grams of the addition product of 1-2-6 hexane triol and propylene oxide (molecular weight 6000, hydroxyl number 28).
8 grams tolylene diisocyanate (80% 2.4 and 20% 2.6).
10 grams glycerol ester of hydrogenated rosin (acid No. 10).
20 grams ethylene glycol ester of rosin (80% in mineral spirits).

The above materials are mixed together and heated to 100° C. for 1 hour. The product is then dissolved in 50 grams toluene, 1 gram stannous octoate added and the mixture spread on paper (as impregnated by the method of my copending application cited above) to give 4 grams dried adhesive per square foot of paper, and dried at 250° F. to evaporate the toluene.

This example yields a tacky adhesive good for use as a masking tape at room temperature.

Example 2

30 grams of the addition product of dipropylene glycol and propylene oxide (molecular weight 2000, hydroxyl No. 56).
180 grams of the addition product of 1-2-6 hexane triol and propylene oxide (molecular weight 6000, hydroxyl No. 28).
30 grams polypropylene glycol (molecular weight 2000).
17 grams tolylene diisocyanate (of the type used in Example 1).
10 grams glycerol ester of hydrogenated rosin.
20 grams ethylene glycol ester of rosin (80% in mineral spirits).

The above materials are mixed together and heated to 100° C. for 1 hour. The so-formed pre-polymer is then diluted and dissolved in 500 grams toluene, 1 gram stannous octoate added and the resulting solution spread and dried as in Example 1.

This example gives a tacky adhesive similar to that of Example 1, but with less quick-stick and better internal strength. It doesn't transfer as much as the product of Example 1 when adhered to and removed from a surface.

Example 3

100 grams of the addition product of dipropylene glycol and propylene oxide (hydroxyl No. 265).
1800 grams of the triol addition product of Example 2.
150 grams of the tolylene diisocyanate of Example 1.
200 grams ethylene glycol ester of rosin (80% in mineral spirits).
50 grams polyterpene resin.
60 grams of the adduct of phenol and osocyanate (bis phenol adduct of methylene bis (4-phenylisocyanate); mol. wt. 439).

The above materials were mixed together and heated at 100° C., for 1 hour. Then 500 grams toluene and 10 grams stannous octoate were added and the pre-polymers dissolved and spread and dried as in Example 1.

The product yielded by this example had good tack and quick-stick at room temperature. At a temperature around 300° F., the mass still remained well adhered to a polished metal surface and when removed after heating, left no deposit of mass.

I normally use an amount of isocyanate adduct containing isocyanate groups equivalent to $\frac{1}{10}$ to $\frac{1}{2}$ those present in the tolylene or other isocyanate used.

The usual antioxidants and inert fillers used in rubber-based adhesive may be used in my adhesives, although my products are usually so stable in aging as not to require an antioxidant. A further unique property of my adhesives is that, while they adhere well to most surfaces such as metal, glass and paper, they do not strongly stick to themselves, so that if accidentally contacted, they are easily separated and rolls of double faced tape can be made without liners.

My final adhesive is solvent resistant, so that normally I do not carry my pre-polymer reaction beyond the point where the pre-polymers are soluble in toluene. It is to be emphasized also that I can make satisfactory adhesives without either resin or plasticizer, although I may use either tackifying resin or plasticizer or both.

While I have stated that the chemistry of polyurethane polymer formation is well known, I do not mean to indicate that the detailed structure and individual properties of the complex mixtures of such polymers can be predicted. These complex mixtures can best be described at the present time by the methods used to form them.

What I claim is:

1. The method for making a pressure-sensitive adhesive, which comprises heating at a temperature and for a period of time required to evaporate the solvent from and complete the reaction of isocyanate groups from an inert, volatile solvent solution of a polyurethane polymer which has been prepared by successive steps as follows: (1) mixing the propylene oxide adduct of 1-2-6 hexane triol, of molecular weight from about 3,000 to about 10,000 and of hydroxyl number from about 28 to about 56 with an isocyanate comprising a major proportion of 2,4 tolylene diisocyanate, in amount from that containing about 0.8 to about twice the isocyanate equivalent to the hydroxyl groups of the said adduct; (2) adding to the mix of step (1) a compatible tackifying resin of acid number below about 10, in amount from about 2 to about 10% of the weight of said adduct, said resin being selected from the class consisting of rosin esters, the glycerol ester of hydrogenated rosin, coumarone-indene resins, unsaturated aliphtaic hydrocarbon resins and polyterpene resins; (3) adding to the mix of step (2) a compatible plasticizer of acid number below about 10, in amount from about 5 to about 25% of the weight of said adduct, said plasticizer being selected from the class consisting of chlorinated diphenyl, the ethylene glycol ester of rosin and the methyl ester of hydrogenated rosin; (4) heating the mix of step (3) to a temperature and for a time sufficient to react the more reactive isocyanate groups to form a pre-polymer soluble in toluene; (5) dissolving the product of step (4) in a volatile, inert solvent and adding a urethane catalyst in the amount from about 0.4% to about 5% of the weight of said pre-polymer, and selected from the class consisting of stannous octoate, stannous dilaurate, dibutyl tin laurate, lead naphthenate and a tertiary amine.

2. The process of claim 1 wherein the said adduct of the said step (1) is replaced by the propylene oxide addition compound of dipropylene glycol, of molecular weight from about 400 to about 3000 and of hydroxyl number from about 56 to about 265.

3. The process of claim 1 wherein the said adduct of the said step (1) is mixed in the proportion from about 10% to about 90% with the said addition compound of claim 2.

4. The process of claim 3 wherein the said inert, volatile solvent solution is coated upon a flexible backing material and the so-coated material is subjected to the said heating.

5. The process of claim 3 wherein the said inert volatile solvent is toluene and the said heating is at 250° F.

6. The process of claim 4 wherein the said backing material is coated with sufficient of said solution to yield an adhesive coating of about 4 grams per square foot of backing material.

7. The process of claim 4 wherein from about 10 to about 50% of the isocyanate equivalent of said isocyanate is replaced by the isocyanate of the bis phenol adduct of methylene bis (4-phenylisocyanate).

8. A pressure-sensitive adhesive comprising a substantially uniform, intimate mixture of the following parts: (1) the polyurethane polymer reaction product of the propylene oxide adduct of 1-2-6 hexane triol, of molecular weight from about 3000 to about 10,000 and of hydroxyl number from about 28 to about 56, with an isocyanate comprising a major proportion of 2,4 tolylene diisocyanate, in amount from about that containing 0.8 to about twice the isocyanate groups equivalent to the hydroxyl groups of said adduct; (2) a compatible tackifying resin of acid number below about 10, in amount from about 2 to about 10% of the weight of said adduct, said resin being selected from the class consisting of rosin esters, the glycerol ester of hydrogenated rosin, coumarone-indene resins, unsaturated aliphatic hydrocarbon resins and polyterpene resins; (3) a compatible plasticizer of acid number below about 10, in amount from about 5 to about 25% of the weight of said adduct, said plasticizer being selected from the class consisting of chlorinated diphenyl, the ethylene glycol ester of rosin and the methyl ester of hydrogenated rosin; (4) a urethane catalyst in amount from about 0.4 to about 5% of the weight of said adduct, said catalyst being selected from the class consisting of stannous octoate, stannous dilaurate, dibutyl tin laurate, lead naphthenate and a tertiary amine.

9. The product of claim 8 coated upon a flexible backing material.

10. The product of claim 8 wherein the said adduct of the said part (1) is replaced by the propylene oxide addition compound of dipropylene glycol, of molecular weight, from about 400 to about 3000 and of hydroxyl number from about 56 to about 265.

11. The product of claim 8 wherein the said adduct of the said part (1) is mixed in the proportion from about 10% to about 90% with the said addition compound of claim 10.

12. The product of claim 8 wherein from about 10 to about 50% of the isocyanate equivalent of said isocyanate is replaced by the isocyanate of the bis phenol methylene bis (4-phenylisocyanate).

References Cited

UNITED STATES PATENTS 3,246,049  4/1966  Webber _____ 260—829

FOREIGN PATENTS 711,324  6/1965  Canada.

OTHER REFERENCES

Athey et al.: "Adiprene L." E. I. du Pont de Nemours and Co., 1958, Wilmington, Del. (pp. 4 to 11 relied on) (copy in group 140).

Saunders et al.: "Polyurethanes Chemistry and Technology," John Wiley and Sons, N.Y., 1964, Tp 986. P6 S3 C.2 (pp. 611 to 613 relied on) (copy in group 140).

DONALD E. CZAJA, *Primary Examiner.*

W. E. PARKER, *Assistant Examiner.*

U.S. Cl. X.R.

117—122; 161—167, 190; 260—77.5, 29.8, 829, 31.2, 31.4, 33.6, 33.8